(12) United States Patent
Okamoto et al.

(10) Patent No.: US 8,626,745 B2
(45) Date of Patent: *Jan. 7, 2014

(54) MULTI-QUERY OPTIMIZATION

(75) Inventors: Russell Okamoto, Beaverton, OR (US); Greg Passmore, Beaverton, OR (US)

(73) Assignee: GoPivotal, Inc., San Mateo, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/110,981

(22) Filed: May 19, 2011

(65) Prior Publication Data

US 2011/0225205 A1  Sep. 15, 2011

Related U.S. Application Data

(63) Continuation of application No. 11/280,827, filed on Nov. 15, 2005, now Pat. No. 7,966,315.

(51) Int. Cl.
*G06F 7/00* (2006.01)
*G06F 17/30* (2006.01)

(52) U.S. Cl.
USPC .......................... 707/715; 707/721; 707/745

(58) Field of Classification Search
USPC ......... 707/689, 693, 711, 714, 715, 721, 745, 707/801
See application file for complete search history.

(56) References Cited

U.S. PATENT DOCUMENTS

| | | | |
|---|---|---|---|
| 5,560,007 A * | 9/1996 | Thai | 1/1 |
| 5,899,988 A | 5/1999 | Depledge et al. | |
| 6,421,662 B1 * | 7/2002 | Karten | 1/1 |
| 6,466,931 B1 * | 10/2002 | Attaluri et al. | 1/1 |
| 6,564,212 B2 | 5/2003 | Koskas | |
| 7,127,467 B2 | 10/2006 | Yalamanchi et al. | |
| 7,752,197 B2 | 7/2010 | Dettinger et al. | |
| 2004/0054666 A1 * | 3/2004 | Lapir et al. | 707/3 |
| 2004/0068489 A1 * | 4/2004 | Dettinger et al. | 707/3 |
| 2004/0193656 A1 * | 9/2004 | Pizzo et al. | 707/201 |

(Continued)

OTHER PUBLICATIONS

Gupta et al. "Performance Comparison of Property Map and Bitmap Indexing" Proceedings of the 5th ACM international workshop on Data Warehousing and OLAP. [online], 2002 [retrieved on Sep. 13, 2012]. Retrieved from the Internet:< URL: http://delivery.acm.org/10.1145/590000/583900/p65-gupta.pdf>. pp. 65-71.*

(Continued)

*Primary Examiner* — James E Richardson
(74) *Attorney, Agent, or Firm* — Fish & Richardson P.C.

(57) ABSTRACT

A database query optimization method is provided for database queries that include predicates, the queries being directed to at least one database table having data in rows and columns. The method includes associating a lineage bit set with each row of the database table, the lineage bit set providing a binary predicate state indication whether each predicate is met or are not met by data in the row. A dependency bit set is established to provide a binary indication of the predicates that are included in each query. Queries are applied against the database table by a logical operation between the lineage bit set and the dependency bit set. A database query optimization data structure includes a lineage bit set associated with each row in the database table. The lineage bit set provides a binary predicate state indication whether each predicate is met or are not met by data in the row. The data structure further includes a dependency bit set that provides a binary indication of the predicates included in each query.

20 Claims, 3 Drawing Sheets

(56) References Cited

U.S. PATENT DOCUMENTS

2005/0154710 A1* 7/2005 Ruhlow et al. .................. 707/3
2005/0216518 A1 9/2005 Hu et al.
2009/0171890 A1* 7/2009 Johnson et al. .................. 707/2

OTHER PUBLICATIONS

Grommon-Litton, J. "Heuristic Design Algorithms and Evaluation Methods for Property Maps," Masters Thesis, ECECS Dept., University of Cincinnati, Cincinnati, OH, Nov. 2000 [retrieved on Sep. 19, 2012]. Retrieved from the Internet:< URL: http://etd.ohiolink.edu/send-pdf.cgi/LITTON%20JENNIFER%20GROMMON.pdf?ucin981488752>. 74 pages.*

Gupta, A. "Performance Comparison of Property Map Indexing and Bitmap Indexing for Data Warehousing," MS Thesis, ECECS Dept., University of Cincinnati, Cincinnati, OH, 2002 [retrieved on Sep. 19, 2012]. Retrieved from the Internet:< URL: http://etd.ohiolink.edu/send-pdf.cgi/GUPTA%20ASHIMA.pdf?ucin1037976189>. 122 pages.*

* cited by examiner

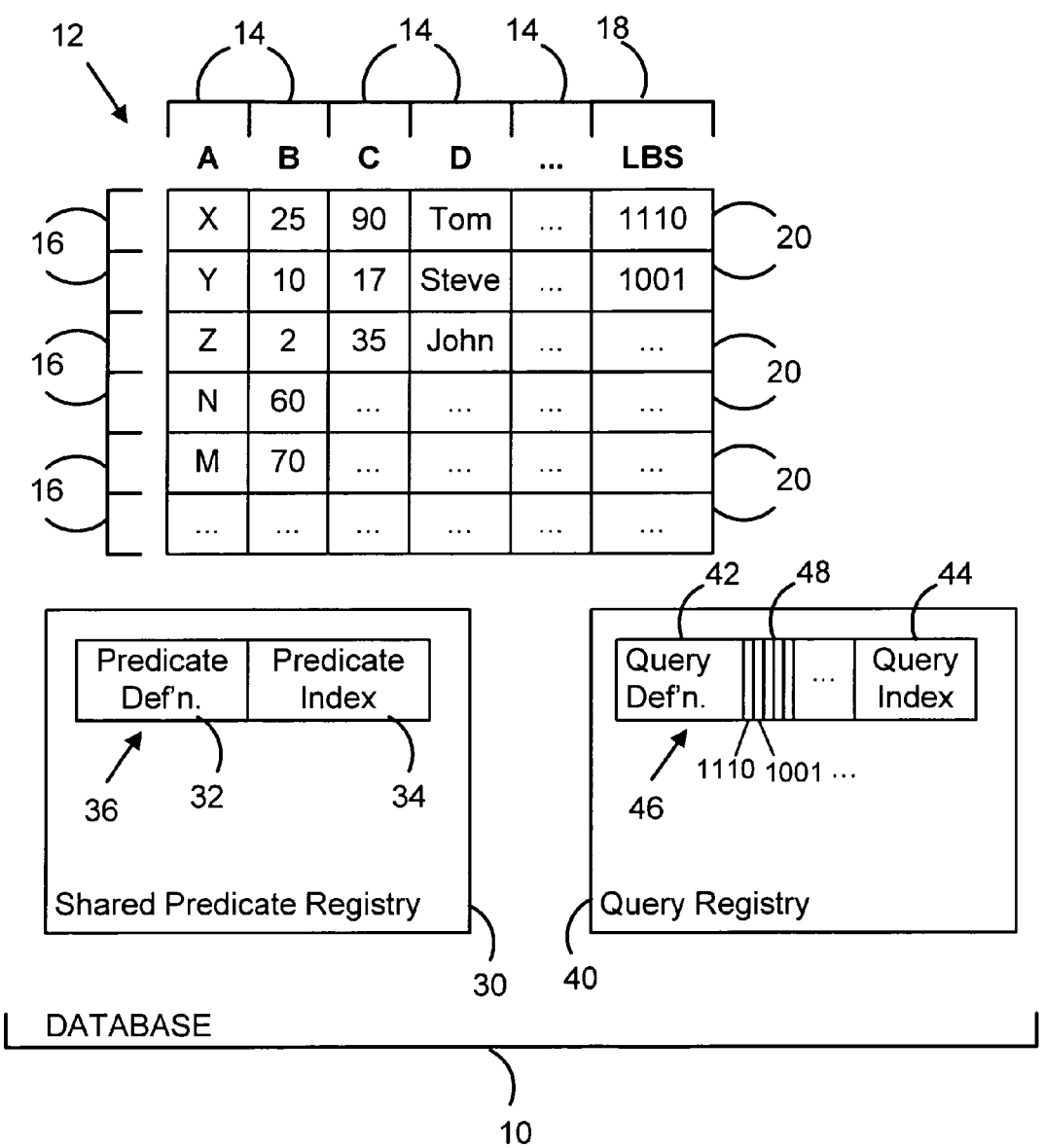

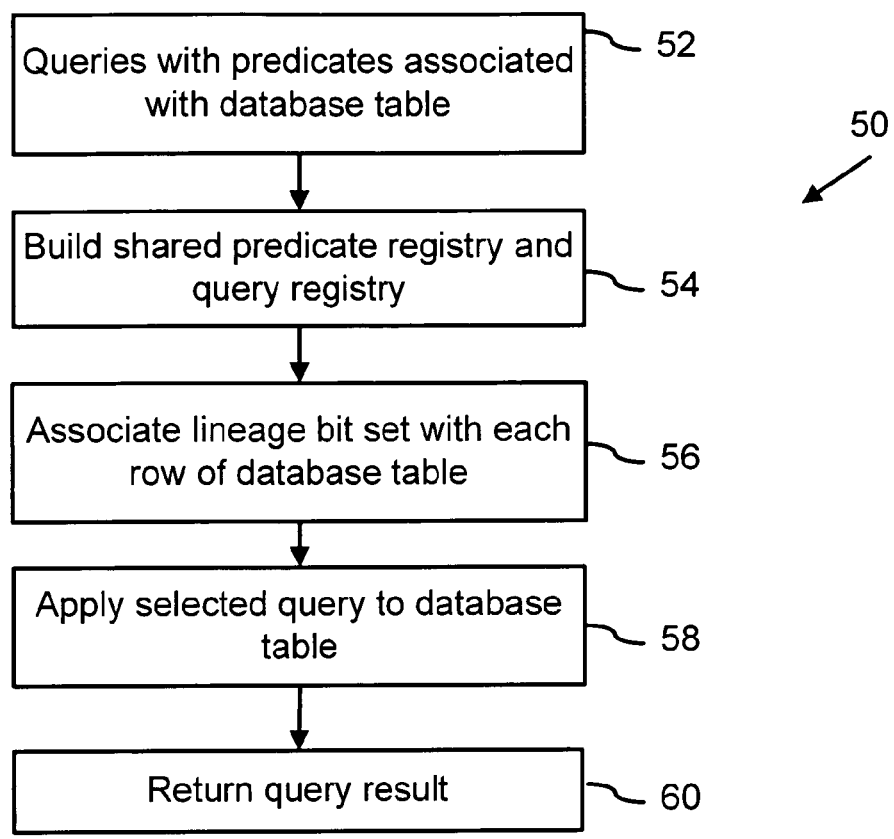

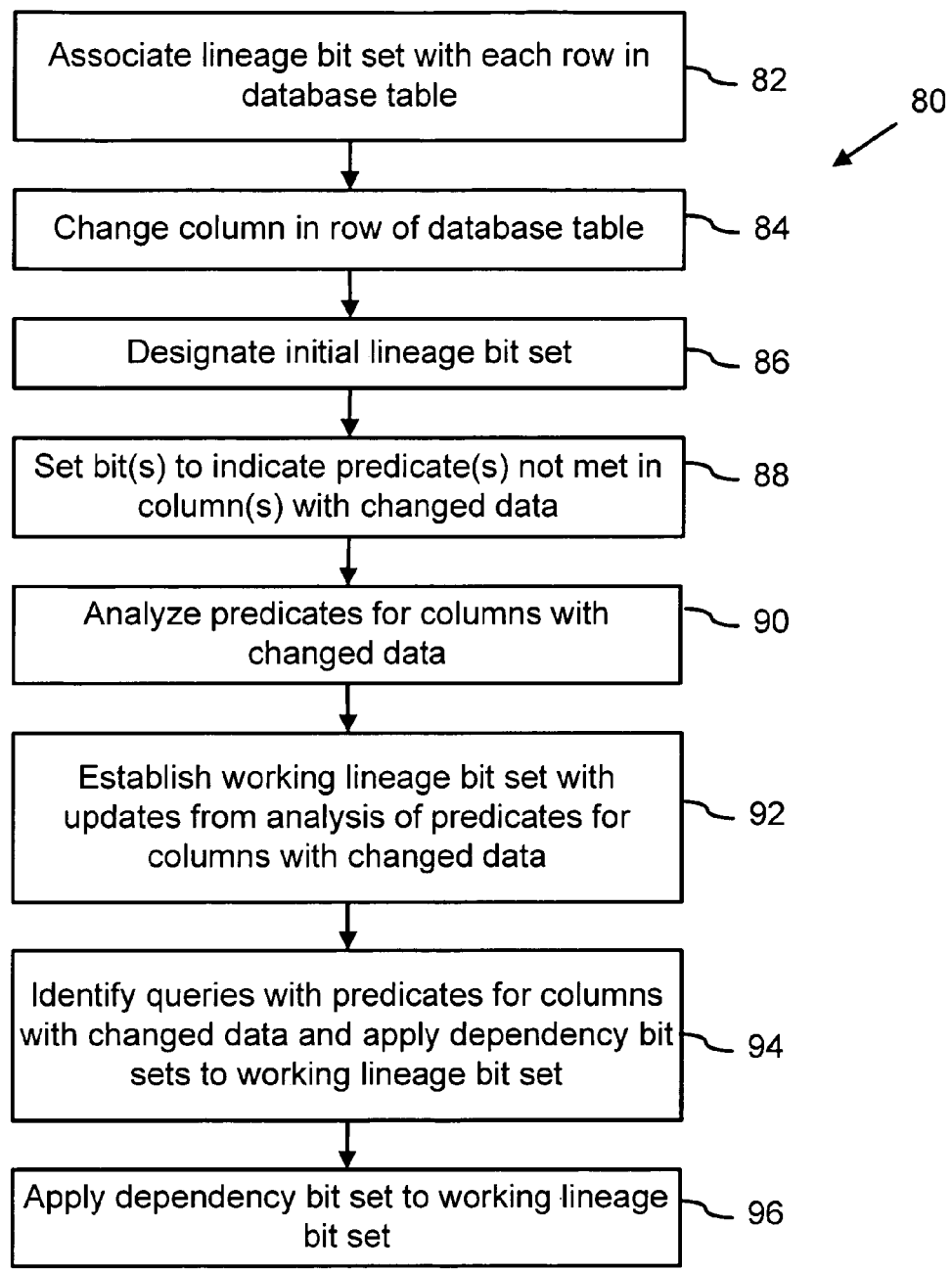

MULTI-QUERY OPTIMIZATION

CROSS-REFERENCE TO RELATED APPLICATIONS

This application is a continuation of U.S. patent application Ser. No. 11/280,827 filed Nov. 15, 2005 and entitled "Multi-Query Optimization," the contents of which are hereby incorporated by reference herein.

FIELD OF INVENTION

The present invention relates to optimization of database queries having multiple predicates and, in particular, to a multi-query optimization that utilizes a binary abstraction of predicates to improve query execution.

BACKGROUND AND SUMMARY OF THE INVENTION

Database systems store, retrieve, and process information. A user retrieves information from the database by providing a query that is written in a query language such as SQL. The query specifies the information to be retrieved and the manner in which it is to be manipulated or evaluated. To process the query, the database system typically converts the query into a relational expression that describes algebraically the result specified by the query. The relational expression is then used to produce an execution plan, which describes particular steps to be taken by a computer in order to produce the sought result.

Formerly, the data in a database was treated as being static with different queries being applied to retrieve portions of the data. More recently, a stream processing or continuous querying model treats the queries as being generally static with the data of the database being dynamically added or updated. The stream processing or continuous querying model accommodates complex queries that are typically formed from common query components or sub-expressions. The common sub-expressions of these complex queries may be used in many different queries.

In the stream processing or continuous querying model, queries are executed instantaneously as data in the database changes or is added. In this context, the importance of utilizing common sub-expressions for query evaluation is paramount, since the processing work done to evaluate a single sub-expression can be shared by multiple queries. Optimizing sets of queries that share common sub-expressions is referred to as multi-query optimization. Query optimization takes a parsed representation of a SQL query as input and is responsible for generating an efficient execution plan for the given SQL query.

A query in the Structured Query Language (SQL) format includes a selection of rows from one or more columns in a specified table according to a specified condition or predicate. For example, a database table "R" may include a column A, with alphabetic values x, y, x, n, etc. in successive rows, and a column B with numeric values 55, 30, 19, 60, etc., in successive rows, respectively, so that values x and 55 are in a common row, values y and 30 are in a common row, and so forth. Table R could include many other columns as well, which could be designated C, D, E, etc.

An SQL query (e.g., referred to as Q(alpha)) may specify, for example, a selection of rows from column A and column B, in Table R, according to the predicate that the numeric values in column B are greater than 50. Another SQL query (e.g., referred to as Q(beta)) may specify, for example, a selection of rows from column A, column B, and column C in Table R, according to the predicate that the numeric values in column B are greater than 75. Queries Q(alpha) and Q(beta) could be just two of many (e.g., hundreds or thousands) of query sub-expressions that are applicable to the database.

In conventional multi-query optimization, query sub-expressions with common predicates, such as queries Q(alpha) and Q(beta), are grouped together to form a group filter or predicate index. Queries Q(alpha) and Q(beta) have common predicates in that both relates to the same variable (i.e., values in column B) and both employ the same operand (i.e., the "greater than" comparison), but different constants (i.e., 50 and 75). The grouping of such queries forms a tree structure for the "B>" predicates in which the nodes in the tree are the different constants of the different predicates.

In this example, the constant value 50 of Q(alpha) forms a first left node of the tree structure, and the constant value 75 of Q(beta) forms a first right node of the tree structure. Successive queries with common predicates are added to the tree structure such that constants with a value greater than a node branch to the right from the node and constants with a value less than a node branch to the left from the node. Once the predicate index is formed, new data can be readily compared against all the common predicate queries according to where the new data fits in the tree structure.

A limitation of such conventional multi-query optimization; however, is that changed data must be compared against all the predicate indices for the table, even if the data changes affect only one column. As a consequence, data changes result in large amounts of query evaluation that require extensive computational resources even when some of the query evaluations are unrelated to the changed data.

Accordingly, the present invention provides multi-query optimization that remembers the outcomes of previous predicate query evaluations to efficiently handle the case where data is changed. In this way, only changes to affected data columns need to be reconciled when continuous query evaluation is performed. In one implementation, the invention includes a database query optimization method for database queries that include predicates, the queries being directed to at least one database table having data in rows and columns. The method includes associating a lineage bit set with each row of the database table, the lineage bit set providing a binary predicate state indication whether each predicate is met or are not met by data in the row. A dependency bit set is established to provide a binary indication of the predicates that are included in each query. Queries are applied against the database table by a logical operation between the lineage bit set and the dependency bit set.

Another aspect of the invention includes a database query optimization data structure, which includes a lineage bit set associated with each row in the database table. The lineage bit set provides a binary predicate state indication whether each predicate is met or are not met by data in the row. The data structure further includes a dependency bit set that provides a binary indication of the predicates included in each query.

A benefit of the lineage bit set is that it preserves the state of previous predicate evaluations. The history of what query predicates a data row currently satisfies is maintained by the bits of the lineage bit set. This is particularly advantageous for handling data updates because query evaluation can be limited to only a subset of involved predicates. When a data row changes, only those predicates associated with modified data columns need to be evaluated. The shared predicate registry can be used to map modified data columns to such involved predicates, so only the identified predicates need to be evaluated for the changed data row. The state of the other, non-involved predicates identified by a query's dependency bit set are preserved in the row's lineage bit set and can be efficiently combined with the involved predicates.

Additional objects and advantages of the present invention will be apparent from the detailed description of the preferred embodiment thereof, which proceeds with reference to the accompanying drawings.

BRIEF DESCRIPTION OF THE DRAWINGS

FIG. 1 is a diagram of a simplified diagram of a database.

FIG. 2 is a flow diagram of a multi-query optimization method according to the present invention.

FIG. 3 is a flow diagram of a multi-query optimization method 80 that is applied when data in a database table is updated.

DETAILED DESCRIPTION

FIG. 1 is a simplified diagram of a database 10 with a table 12 having columns 14 (designated A, B, C, D, etc.) and rows 16. Table 12 has a designation (e.g., Table R). In this example, column A includes successive alphabetic values X, Y, Z, N, M, and column B includes successive numeric values 25, 10, 2, 60, 70. Columns C, D, etc. may include other numeric or alphabetic values, as well. For example, column C may contain successive numeric values 90, 17, 35, etc., and column D may contain successive alphabetic values (e.g., names), such as Tom, Steve, John, etc. Database 10 would typically include plural tables, but only one is shown for purposes of illustration.

Database table 12 includes an additional column 18 that contains a lineage bit set 20 for each row in the table 12, according to the present invention. As described below in greater detail, the lineage bit set 20 for each row 16 is a data structure that specifies the query predicates or sub-expressions that are met or satisfied by the data in that row 16. The query predicates or sub-expressions arise from queries that are associated with database 10. Column 18 may be referred to herein as lineage bit set column 18.

All predicates for queries applied to a table are numbered in sequence and are designated by corresponding bits in lineage bit set 20. For N-number of queries employing M-number of unique predicates, lineage bit set 20 will include M-number of binary bits, with each bit indicating whether the corresponding predicate is met by data in that row. In one implementation, a value 1 indicates that the corresponding predicate is true or met for the row, and a value 0 indicates that the corresponding predicate is not true or met for the row.

For example, a first query Q1 may specify, for example, a selection of rows from column A and column B, in Table R, according to the predicate that the numeric values in column B are greater than 5 and the predicate that the numeric values in column C are greater than 80 and the predicate that the alphabetic values in column D equal "Tom." Query Q1 may be tabulated as follows: [0021] Select: Col. A, Col. B [0022] From: Table R [0023] Where: B>5 and [0024] C>80, and [0025] D=Tom In this illustration, the predicates B>5, C>80, and D=Tom may be designated as predicates P0, P1, and P2, respectively.

As another example, a second query Q2 may specify, for example, a selection of rows from column A, column B, and column C in Table R, according to the predicate that the numeric values in column B are greater than 5 and the predicate that the alphabetic values in column D equal "Steve." Query Q2 may be tabulated as follows: [0028] Select: Col. A, Col. B, Col. C [0029] From: Table R [0030] Where: B>5 and [0031] D=Steve In this illustration, the predicate B>5 has already been designated as predicate P0. The predicate D=Steve is designated as predicate P3 as the next successive predicate to be designated from the queries applied to Table R.

With reference to queries Q1 and Q2, for example, the lineage bit sets 20 for each row in Table R include 4 bits that correspond to the 4 predicates P0-P3 associated with the queries. In the example of FIG. 1, lineage bit set 20 for the first row of table R is 1110, which indicates that predicates P0-P2 are met by the data of the first row and that the predicate P3 is not met. Likewise, lineage bit set 20 for the second row of table R is 1001, which indicates that predicates P0 and P3 are met by the data of the first row and that the predicates P1 and P2 are not met. It will be appreciated that lineage bit sets 20 will typically have many more than 4 bits because a typical database 10 will typically have up to hundreds or thousands of associated queries.

Database 10 includes a shared predicate registry 30 having a predicate registry data structure 36 that includes a predicate definition 32 and a corresponding predicate index 34. FIG. 1 illustrates the exemplary predicates B>5, C>80, D=Tom, D=Steve as predicate definitions 32 in association with their corresponding indices 0-3, respectively. Additional predicates from other queries associated with Table R are added to shared predicate registry 30 with successively increasing indices. Each lineage bit set 20 in lineage bit set column 18 includes a bit for each predicate definition 32 in registry 30. It will be appreciated, therefore, that each lineage bit set will have a number of bits corresponding to the highest value in predicate index 34, plus 1, to account for index 34 beginning with the value zero.

Database 10 also includes a query registry 40 having a query registry data structure 46 that includes a query definition 42 and a corresponding query index 44. Each query definition 42 includes a set of dependency bit sets 48 with bits that correspond to the predicates that are applied by the query. There is a dependency bit set 48 for each query and each table to which the query is applied. Each dependency bit set 48 is associated with a database table and includes the same number of bits as are in the lineage bit set 20 stored within each row of the database table. The difference is that the bits in the dependency bit set 48 correspond to predicates that that are used in the query, while the lineage bit set 20 corresponds to the data in a row that meet the predicates.

FIG. 1 illustrates that query Q1, which is identified by index 1, has the dependency bit set 1110 indicating that predicates P0-P2 are used by query Q1, and that predicate P3 is not. Query Q2, which is identified by index 2, has the dependency bit set 1001 indicating that predicates P0 and P3 are used by query Q2, and that predicates P1 and P2 are not.

FIG. 2 is a flow diagram of a multi-query optimization method 50 that forms and utilizes the lineage bit sets 18 to improve optimization of multiple queries for a database. Multi-query optimization method 50 is computer-implemented in accordance with corresponding software instructions that are stored on a computer-readable medium.

Step 52 indicates that a database has associated with it queries with predicates specified for potentially a plurality of database tables.

Step 54 indicates that a shared predicate registry 30 and a query registry 40 are built from the predicates of the queries associated with the database tables. Query registry 40 includes query definitions 42 with a dependency bit sets 46 that have bits corresponding to the predicates that are applied by the query.

Step 56 indicates a lineage bit set 20 is associated with each row of a database table indicating which of the predicates in the shared predicate registry are met or satisfied by the data in the row.

Step 58 a selected one of the queries is applied to the database table to determine which rows in the database table meet or satisfy the selected query. With each lineage bit set 20 represented as LIN and the dependency bit set 48 for the selected query represented as DEP, the selected query may be applied to each row by the logical AND operation:

LIN AND DEP

The predicates of the selected query are met or satisfied whenever:

LIN AND DEP=DEP.

The predicates of the selected query are not met or satisfied, and the query conditions are not met, whenever the AND operation does not equal DEP.

Step 60 indicates that a query result is returned according to whether or not the AND operation equals DEP.

Computer execution of an AND operation between two bit sets is very fast and efficient. The present invention provides, therefore, a very fast and efficient mechanism for executing arbitrary numbers of queries against a database of arbitrary size. In particular, the lineage bit set 20 and the dependency bit set 48 provide binary abstraction of predicates that allow large numbers of queries to be applied to arbitrary amounts of data with an efficiency that is greatly improved over conventional multi-query optimization techniques.

A benefit of the lineage bit set is that it preserves the state of previous predicate evaluations. In other words, the history of what query predicates a data row currently satisfies is maintained by the bits of the lineage bit set. This is particularly advantageous for handling data updates because query evaluation can be limited to only a subset of involved predicates. When a data row changes, only those predicates associated with modified data columns need to be evaluated. The shared predicate registry can be used to map modified data columns to such involved predicates, so only the identified predicates need to be evaluated for the changed data row. The state of the other, non-involved predicates identified by a query's dependency bit set are preserved in the row's lineage bit set and can be efficiently combined with the involved predicates.

The lineage bit set also has a corresponding integer (i.e., the last predicate analyzed integer) that indicates the highest ordered predicate that was analyzed for a given row. Since new predicates may be dynamically added in real-time, each row must keep track of the newest predicate against which the row has been analyzed. New predicates are assigned a new ID when they are registered in the shared predicate registry 30. When a tuple is analyzed, its last predicate analyzed integer is compared to the highest ordered predicate in the shared predicate registry 30. If there is any difference, the new predicates are also considered failed for the new tuple, and must be analyzed. After this analysis, the tuple's last predicate analyzed integer is set to the new highest ordered predicate ID.

If the last predicate analyzed integer were not tracked, then all rows would have to be completely re-analyzed each time any predicate was added, rather than just analyzing the new and change-dependent predicates. This technique, therefore, enables predicates to be flexibly added at runtime without incurring processing spikes and query evaluation delays.

FIG. 3 is a flow diagram of a multi-query optimization method 80 as applied when data in a database table is updated (i.e., changed or added). The improved execution of queries provided by the present invention also provides improved execution of queries when data in a table is changed or added (collectively, updated). The following description is directed to data that is changed in an existing database entry.

Step 82 indicates that each row in the database table has an associated initial lineage bit set 18 (LIN). For example, the initial lineage bit set may be 1110, such as lineage bit set 20 for the first row of table R in FIG. 1. Each predicate represented by a bit in the lineage bit set 18 (LIN) corresponds to data in one column of the row.

Step 84 indicates data in one or more columns of a row in the database table is changed.

Step 86 indicates that the initial lineage bit set 18 (LIN) for the row is re-designated as the initial lineage bit set (initLIN).

Step 88 indicates that each bit in the initial lineage bit set (initLIN) corresponding to a column with changed data is set to indicate that the predicate is not met or satisfied (e.g. set to 0). For example, with a data change that affects only column B, the initial lineage bit set (initLIN) for the first row of table R in FIG. 1 would be set from 1110 to 0110, wherein the first bit is the only bit of a predicate that corresponds to column B.

Step 90 indicates that the predicates for the column or columns with changed data are analyzed against the data in those columns to determine whether those predicates are met or satisfied.

Step 92 indicates that a working lineage bit set (workLIN) is established from the initial lineage bit set (initLIN), with updates reflecting the analysis of the predicates for the column or columns with changed data against the data in those columns. For example, analysis of the predicate corresponding to the first bit against the new data in column B will result in the first bit remaining 0 if the predicate is not met, or being changed to 1 if the predicate is met.

Step 94 indicates that queries with predicates for the column or columns with changed data are identified and the dependency bit set DEP for each such query DEP is applied to the working lineage bit set (workLIN) by the logical AND operation:

workLIN AND DEP

The predicates of each query are met or satisfied whenever:

workLIN AND DEP=DEP.

Step 96 indicates that the dependency bit set DEP for each query DEP is applied to the initial lineage bit set (initLIN) by the logical AND operation: [0063] initLIN AND DEP.

Having access to the pre-analysis initial lineage bitset, as well as the manipulated working bitset, allows for some optimizations with regard to processing the outcome of the analysis. Given the two bitsets and the dependency bitset for a given query, it is possible to tell if the changes to the row result in a new match, an update to an existing match, a no longer match, or a still doesn't match condition. This insight allows certain changes to be ignored, for example, if a row is changed such that it still doesn't match a given query, it can be ignored completely. This allows for a reduction in computation as well as the opportunity to provide enriched predicate state transition information to subsequent processing logic.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A method for updating a database table having multiple rows, the method comprising:
    maintaining predicates of received database queries in a predicate registry, wherein each predicate is associated with a different index value in the predicate registry, the predicates having an order in which a more recent predicate is ordered higher than a less recent predicate;
    for each row of the database table, maintaining a lineage bit set and a last-predicate-analyzed indicator, wherein:
        the lineage bit set includes multiple bit positions, each bit position in the lineage bit set corresponding to a query predicate,
        a bit value stored at each bit position indicates whether the corresponding predicate is satisfied by the row, and
        the last-predicate-analyzed indicator identifies a most recent predicate used in a most recent evaluation of the lineage bit set of the row; and
    receiving an update to an entry in the database table, wherein the entry corresponds to a first row of the database table and, in response to receiving the update:
        updating one or more bit positions in the lineage bit set of the first row that have previously been evaluated and require re-evaluation as a result of the received update;
        determining that the last-predicate-analyzed indicator of the first row identifies a predicate that is different from a currently most recent predicate in the predicate registry; and then
        evaluating one or more new predicates that entered the predicate registry to update one or more new bit positions in the lineage bit set of the first row that correspond to the one or more new predicates, wherein each new predicate is a predicate that is ordered higher than the predicate identified by the last-predicate-analyzed indicator of the first row.

2. The method of claim 1, further comprising saving a state of the lineage bit set of the first row of the database table corresponding to the update.

3. The method of claim 2, further comprising comparing the saved state of the lineage bit set of the first row of the database table with a state of the lineage bit set after the updating operations to determine whether any past query results need to be updated.

4. The method of claim 1, wherein each last-predicate-analyzed indicator is an integer.

5. The method of claim 4, wherein evaluating the one or more new predicates in the predicate registry comprises:
    updating the lineage bit set of the first row to reflect an updated evaluation of all the predicates in the predicate registry.

6. The method of claim 1, comprising:
    for a received database query, maintaining a dependency bit set having multiple bit positions, wherein each bit position in the dependency bit set corresponds to a query predicate, and wherein a bit value for each bit position in the dependency bit set indicates whether the corresponding predicate is part of in the received query; and
    determining whether a row satisfies the received database query by comparing the dependency bit set with the lineage bit set.

7. The method of claim 1, further comprising, after evaluating the one or more new predicates, updating the last-predicate-analyzed indicator of the first row to identify a new most recent predicate.

8. A non-transitory computer-readable storage medium including instructions for updating a database table having multiple rows, the instructions, when executed on a processor, operable to cause the processor to perform operations comprising:
    maintaining predicates of received database queries in a predicate registry, wherein each predicate is associated with a different index value in the predicate registry, the predicates having an order in which a more recent predicate is ordered higher than a less recent predicate;
    for each row of the database table, maintaining a lineage bit set and a last-predicate-analyzed indicator, wherein:
        the lineage bit set includes multiple bit positions, each bit position in the lineage bit set corresponding to a query predicate,
        a bit value stored at each bit position indicates whether the corresponding predicate is satisfied by a the row, and
        the last-predicate-analyzed indicator identifies a most recent predicate used in a most recent evaluation of the lineage bit set of the row; and
    receiving an update to an entry in the database table, wherein the entry corresponds to a first row of the database table and, in response to receiving the update:
        updating one or more bit positions in the lineage bit set of the first row that have previously been evaluated and require re-evaluation as a result of the received update;
        determining that the last-predicate-analyzed indicator of the first row identifies a predicate that is different from a currently most recent predicate in the predicate registry; and then
        evaluating one or more new predicates that entered the predicate registry to update one or more new bit positions in the lineage bit set of the first row that correspond to the one or more new predicates, wherein each new predicate is a predicate that is ordered higher than the predicate identified by the last-predicate-analyzed indicator of the first row.

9. The non-transitory computer-readable storage medium of claim 8, the operations including saving a state of the lineage bit set of the first row of the database table corresponding to the update.

10. The non-transitory computer-readable storage medium of claim 9, the operations including comparing the saved state of the lineage bit set of the first row of the database table with a state of the lineage bit set after the updating operations to determine whether any past query results need to be updated.

11. The non-transitory computer-readable storage medium of claim 9, wherein each last-predicate-analyzed indicator is an integer.

12. The non-transitory computer-readable storage medium of claim 11, wherein evaluating the one or more new predicates in the predicate registry comprises:
    updating the lineage bit set of the first row to reflect an updated evaluation of all the predicates in the predicate registry.

13. The non-transitory computer-readable storage medium of claim 8, the operations comprising:

for a received database query, maintaining a dependency bit set having multiple bit positions, wherein each bit position in the dependency bit set corresponds to a query predicate, and wherein a bit value for each bit position in the dependency bit set indicates whether the corresponding predicate is part of in the received query; and determining whether a row satisfies the received database query by comparing the dependency bit set with the lineage bit set.

14. The non-transitory computer-readable storage medium of claim 8, the operations further including, after evaluating the one or more new predicates, updating the last-predicate-analyzed indicator of the first row to identify a new most recent predicate.

15. A database system configured to update a database table having multiple rows, the database system comprising:

a data store; and a processor configured to perform operations comprising:
maintaining predicates of received database queries in a predicate registry, wherein each predicate is associated with a different index value in the predicate registry, the predicates having an order in which a more recent predicate is ordered higher than a less recent predicate;

for each row of the database table, maintaining in the data store a lineage bit set and a last-predicate-analyzed indicator, wherein:

the lineage bit set includes multiple bit positions, each bit position in the lineage bit set corresponding to a query predicate, a bit value stored at each bit position indicates whether the corresponding predicate is satisfied by a value in the row, and the last-predicate-analyzed indicator identifies a most recent predicate used in a most recent evaluation of the lineage bit set of the row;

receiving an update to an entry in the database table, wherein the entry corresponds to a first row of the database table updating one or more bit positions in the lineage bit set of the first row that have previously been evaluated and require re-evaluation as a result of the received update;

determining that the last-predicate-analyzed indicator of the first row identifies a predicate that is different from a currently most recent predicate in the predicate registry; and then evaluating one or more new predicates that entered the predicate registry to update one or more new bit positions in the lineage bit set of the first row that correspond to the one or more new predicates, wherein each new predicate is a predicate that is ordered higher than the predicate identified by the last-predicate-analyzed indicator of the first row.

16. The database system of claim 15, the operations comprising saving a state of the lineage bit set of the first row of the database table corresponding to the update.

17. The database system of claim 16, the operations comprising comparing the saved state of the lineage bit set of the first row of the database table with a state of the lineage bit set after the updating operations to determine whether any past query results need to be updated.

18. The database system of claim 16, wherein each last-predicate-analyzed indicator is an integer.

19. The database system of claim 15, the operations comprising:

for a received database query, maintaining a dependency bit set having multiple bit positions, wherein each bit position in the dependency bit set corresponds to a query predicate, and wherein a bit value for each bit position in the dependency bit set indicates whether the corresponding predicate is part of in the received query; and determining whether a row satisfies the received database query by comparing the dependency bit set with the lineage bit set.

20. The database system of claim 15, the operations comprising, after evaluating the one or more new predicates, updating the of the last-predicate-analyzed indicator of the first row to identify a new most recent predicate.

* * * * *

UNITED STATES PATENT AND TRADEMARK OFFICE
CERTIFICATE OF CORRECTION

PATENT NO. : 8,626,745 B2
APPLICATION NO. : 13/110981
DATED : January 7, 2014
INVENTOR(S) : Russell Okamoto and Greg Passmore Page 1 of 1

It is certified that error appears in the above-identified patent and that said Letters Patent is hereby corrected as shown below:

In the Claims

Column 8, line 27, claim 8: delete "a the" and insert -- the --, therefor.

Column 10, line 39, claim 20: delete "the of the" and insert -- the --, therefor.

Signed and Sealed this
Twenty-first Day of October, 2014

Michelle K. Lee
*Deputy Director of the United States Patent and Trademark Office*